US012804531B2

(12) United States Patent
Ren et al.

(10) Patent No.: US 12,804,531 B2
(45) Date of Patent: Nov. 17, 2026

(54) IN-VEHICLE COMMUNICATION METHOD, APPARATUS, AND SYSTEM

(71) Applicant: Yinwang Intelligent Technologies Co., Ltd., Shenzhen (CN)

(72) Inventors: Qiandong Ren, Shanghai (CN); Shunan Fan, Beijing (CN); Wenwei Zhao, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 18/640,498

(22) Filed: Apr. 19, 2024

(65) Prior Publication Data

US 2024/0267840 A1 Aug. 8, 2024

Related U.S. Application Data

(63) Continuation of application No. PCT/CN2022/125479, filed on Oct. 14, 2022.

(30) Foreign Application Priority Data

Oct. 22, 2021 (CN) ......................... 202111234231.5

(51) Int. Cl.
*H04W 48/18* (2009.01)
*H04W 48/08* (2009.01)

(52) U.S. Cl.
CPC ........... *H04W 48/18* (2013.01); *H04W 48/08* (2013.01)

(58) Field of Classification Search
CPC ....... H04W 48/18; H04W 48/08; H04W 4/44; H04W 4/60; H04W 4/48; H04W 8/18;
(Continued)

(56) References Cited

U.S. PATENT DOCUMENTS

2010/0234071 A1* 9/2010 Shabtay ................. H04B 7/155 455/562.1
2015/0186094 A1* 7/2015 Ricci ....................... G06F 13/14 701/36

(Continued)

FOREIGN PATENT DOCUMENTS

CN 106060960 A 10/2016
CN 110868710 A 3/2020

(Continued)

OTHER PUBLICATIONS

GSM Association, Official Document SGP.22-RSP Technical Specification, RSP Technical Specification Version 2.2, Sep. 1, 2017, total 264 pages.

*Primary Examiner* — Don N Vo
(74) *Attorney, Agent, or Firm* — WOMBLE BOND DICKINSON (US) LLP

(57) ABSTRACT

Embodiments of this application provide an in-vehicle communication method, apparatus, and system, and relate to the field of in-vehicle communication technologies. The method includes: A first node obtains target APN information of the first node based on information about an operator that provides a service for the first node, where the target APN information indicates at least two APNs, and the at least two APNs include a customized APN of the first node; and accesses a target communication network based on the information about the operator and the target APN information. In the method, the required target APN information may be flexibly configured for the first node based on a service requirement of the first node, so that the first node accesses the target communication network.

15 Claims, 10 Drawing Sheets

(58) Field of Classification Search
CPC .. H04W 48/00; B60R 16/023; H04L 41/0803; H04L 67/01; H04L 67/303
USPC .......................................................... 455/434
See application file for complete search history.

(56) References Cited

U.S. PATENT DOCUMENTS

| | | | | |
|---|---|---|---|---|
| 2015/0382286 | A1 | 12/2015 | Daoud | |
| 2019/0110154 | A1* | 4/2019 | Jantzi ...................... | H04W 4/70 |
| 2020/0267531 | A1 | 8/2020 | Osterwise et al. | |
| 2023/0199636 | A1* | 6/2023 | Hoshino ............. | H04W 36/324<br>370/331 |

FOREIGN PATENT DOCUMENTS

| | | | |
|---|---|---|---|
| CN | 109167675 | B | 8/2021 |
| WO | 2020124528 | A1 | 6/2020 |

* cited by examiner

IN-VEHICLE COMMUNICATION METHOD, APPARATUS, AND SYSTEM

CROSS-REFERENCE TO RELATED APPLICATIONS

This application is a continuation of International Patent Application No. PCT/CN2022/125479, filed on Oct. 14, 2022, which claims priority to Chinese Patent Application No. 202111234231.5, filed on Oct. 22, 2021. The disclosures of the aforementioned applications are hereby incorporated by reference in their entireties.

TECHNICAL FIELD

Embodiments of this application relate to the field of in-vehicle communication technologies, and in particular, to an in-vehicle communication method, apparatus, and system.

BACKGROUND

Currently, with development of in-vehicle communication technologies, an in-vehicle terminal gradually supports a plurality of access point networks (APN). The APN is allocated to the in-vehicle terminal for dedicated use to implement a network access function of the in-vehicle terminal, or allocated to a user for network access. To implement the network access function of the in-vehicle terminal, in some designs, an embedded SIM card (Embedded-SIM, eSIM) on the in-vehicle terminal is used to provide the network access function for the in-vehicle terminal.

However, different eSIMs need to access different operators to implement the network access function. Operators in different countries and regions around the world are different, and a same operator may have a plurality of different APNs. A user may have a requirement for changing an operator or an APN. A current in-vehicle communication technology cannot flexibly configure APN information. When the user has the requirement for changing the operator or the APN, the network access function of the in-vehicle terminal is limited.

SUMMARY

Embodiments of this application provide an in-vehicle communication method, apparatus, and system. An APN information configuration mechanism is introduced into a related in-vehicle communication standard protocol, so that a user can autonomously select an operator that provides a service, and flexibility of configuring APN information for an in-vehicle terminal is improved.

According to a first aspect, an embodiment of this application provides an in-vehicle communication method. The method may be applied to a first node. For example, the first node may be an in-vehicle terminal of a vehicle. The method may include:

obtaining target access point network APN information of the first node based on information about an operator that provides a service for the first node, where the target APN information indicates at least two APNs, and the at least two APNs include a customized APN of the first node; and accessing a target communication network based on the information about the operator and the target APN information.

In an embodiment of the application, the information about the operator may indicate the operator that provides the service for the first node. The operator may be an operator configured for the first node before delivery, or may be an operator autonomously selected by a user on a first node side. The target APN information is APN information of the operator. Based on the information about the operator and the target APN information, the first node may access the target communication network, to provide the service for the first node in the target communication network.

The service provided by the operator for the first node may be a network access service, including but not limited to an Internet service, a cellular communication service, an SMS message service, or the like. Generally, the user on the first node side may determine a target operator from a plurality of operators, and apply to the target operator for handling an eSIM service. The target operator may handle the eSIM service for the first node, and may directly or indirectly provide the target APN information, a target profile, and target activation code for the first node, so that the first node can locally activate the eSIM service based on the target APN information, the target profile, and the target activation code, to provide a network access service for the first node or the user on the first node side.

For example, the first node is an in-vehicle terminal of a vehicle. The at least two APNs indicated by the target APN information may include, for example, an APN allocated to a user of the vehicle for use, to provide the user with the following network connection services, including but not limited to: online navigation, an online audio, an online video, an online voice, or the like. Alternatively, the at least two APNs indicated by the target APN information may include, for example, a dedicated APN used for the in-vehicle terminal, to provide the in-vehicle terminal with the following network connection services, including but not limited to: a remote viewing service of dashboard camera data, a remote vehicle control service, a security surveillance service, an over-the-air technology (OTA) upgrade package download service, a vehicle abnormality information reporting service, or the like. The dedicated APN of the in-vehicle terminal may include a customized APN. The customized APN may be used to implement the following services: an OTA upgrade package download service, a vehicle remote control service, a vehicle abnormality information reporting service, or the like.

According to the foregoing method, an APN information configuration mechanism is introduced into a related in-vehicle communication standard protocol, so that after learning of operator information of a target operator, the first node may directly or indirectly obtain, based on the operator information, target APN information associated with the operator information. In this way, the first node may locally activate the network access service based on the operator information and the target APN information. The method allows the user to select an operator more flexibly, or change an operator at any time without replacing a new device. This saves more costs of using a mobile device for a common consumer, an enterprise user, and the like, and bringing more convenience and security communication.

With reference to the first aspect, in an embodiment, the method may further include: obtaining a target profile of the first node, where the target profile includes the information about the operator, and the target profile is associated with the target APN information.

According to the foregoing method, in an embodiment, the first node may obtain the operator information from a target profile of the first node, to obtain the target APN information based on the operator information. The target profile is a profile (which may also be referred to as an eSIM profile) that is provided by the target operator and that is used to activate the eSIM service of the first node. The profile may include configuration data used to configure the eSIM service of the first node and implement the network access service of the first node, for example, metadata (data used to describe data) and authentication data for accessing a network.

With reference to the first aspect, in an embodiment, the method further includes: obtaining target activation code of the first node, where the target activation code is associated with the operator information and the target APN information, and the target activation code indicates a first functional entity from which a target profile of the first node is to be obtained.

According to the foregoing method, in an embodiment, the first node may obtain the target APN information based on the target activation code of the first node. For example, the target activation code may indicate the first functional entity from which the target profile of the first node is to be obtained, the first node may obtain the target profile based on the target activation code, the target profile may include the operator information, and the first node may obtain the target APN information based on the operator information obtained from the target profile.

For example, the first functional entity may be a subscription manager data preparation+ (SM-DP+) functional entity described in an eSIM global system for mobile communications association (GSMA) standard (for example, SGP.22), where "+" indicates that the functional entity is enhanced (for example, has more functions) compared with the SM-DP described in the SGP.02 protocol. In an optional manner, the first functional entity may be deployed on an operator server, or the first functional entity may be a communication device independent of an operator server and may be configured to store a related profile of an operator. A product form or a deployment manner of the first functional entity is not limited in an embodiment of the application.

It should be noted that the SM-DP+ is merely an example description of the first functional entity described in an embodiment of the application, but is not a limitation. In another embodiment or a future in-vehicle communication technology, the first functional entity may alternatively have another name. This is not limited in an embodiment of the application.

With reference to the first aspect, in an embodiment, the obtaining target activation code of the first node includes: obtaining the target activation code of the first node from a second node, where the first node includes an in-vehicle terminal of a vehicle, and the second node includes any one of the following: a smart device associated with the vehicle, an in-vehicle application running on the vehicle, a vehicle server, or an operator server that provides the service for the vehicle.

According to the foregoing method, in an embodiment, the first node may obtain the target activation code of the first node from a second node like a smart device associated with the vehicle, an in-vehicle application running on the vehicle, the vehicle server, or an operator server that provides the service for the vehicle, to provide a plurality of implementations of a mechanism for configuring the APN information, and improve flexibility of the configuration mechanism.

It should be noted that, in an embodiment of the application, a manner of obtaining the target activation code is merely described as an example instead of any limitation. In another embodiment, the target activation code may alternatively be obtained in an embodiment, and the activation code is merely an example of obtaining profile information. In another embodiment, the obtained profile information may also have another name or other information. Details are not described herein again.

With reference to the first aspect, in an embodiment, the obtaining target APN information of the first node includes: obtaining the target APN information of the first node from stored APN information; or obtaining the target APN information of the first node from a third node, where the first node includes an in-vehicle terminal of a vehicle, and the third node includes any one of the following: a smart device associated with the vehicle, an in-vehicle application running on the vehicle, the vehicle server (referred to as a vehicle server in this specification for short), or an operator server that provides the service for the vehicle.

According to the foregoing method, a configuration mechanism of the APN information may be implemented in a plurality of manners. For example, the first node may locally store a plurality of pieces of APN information of a plurality of operators, so that the first node selects target APN information of the target operator from the plurality of pieces of APN information, or the plurality of pieces of APN information of the plurality of operators may be, for example, stored in the third node like the smart device, the in-vehicle application, the vehicle server, or the operator server, the first node may obtain the target APN information from the third node.

It should be understood that, in an embodiment of the application, the first node, the second node, and the third node are merely used to distinguish between different nodes, and are not intended to limit functions of the different nodes. The second node or the third node in an embodiment of the application may not be limited to the foregoing examples. For example, the second node or the third node may be an in-vehicle terminal of another vehicle. Details are not described herein again.

With reference to the first aspect, in an embodiment, the method further includes: storing the target APN information and/or mapping relationship information, where the mapping relationship information indicates an association relationship between the target APN information and one or more pieces of the following information: the first node, the information about the operator, the target profile of the first node, or the target activation code of the first node.

According to the foregoing method, the first node may store the target APN information and the mapping relationship information between the target APN information and other information. If required, the first node may access the target communication network based on the stored related information.

According to a second aspect, an embodiment of this application provides an in-vehicle communication method. The method may be applied to a second node. For example, the second node may be a vehicle server or an operator server that provides a service. The method includes:

obtaining, by the second node, target APN information of the first node based on information about an operator that provides a service for the first node, where the target APN information indicates at least two APNs, and the at least two APNs include a customized APN of the first node; and sending, by the second node, the target APN information to the first node.

According to the foregoing method, a configuration mechanism of APN information is introduced into a related in-vehicle communication standard protocol. After learning of information about an operator that provides a service for the first node, the second node may directly or indirectly obtain, based on the information about the operator, the target APN information associated with the information about the operator and notify the first node, so that the first node may locally activate, based on the information about the operator and the target APN information, a network access service corresponding to an eSIM service. The method allows a vehicle server or an operator server to provide a user with a more flexible manner of autonomously selecting an operator, or change an operator at any time without replacing a new device. This saves more costs of using a mobile device for a common consumer, an enterprise user, and the like, and bringing more convenience and security communication.

With reference to the second aspect, in an embodiment, the second node is an operator server that provides the service, and the method further includes: receiving a first request from a third node, where the first request is used to apply for the service for the first node; and in response to the first request, sending target activation code to the first node through the third node, where the target activation code is associated with the information about the operator and the target APN information.

According to the foregoing method, in an embodiment, when the second node is an operator server, the second node may directly or indirectly provided the first node with the target activation code, so that the first node may obtain the target APN information based on the target activation code and access the target communication network, and a plurality of implementations of a configuration mechanism of the APN information is provided, thereby improving flexibility of the configuration mechanism. With reference to the second aspect, in an embodiment, the first node includes an in-vehicle terminal of a vehicle, the second node is the vehicle server. The method further includes: obtaining target activation code of the first node from a third node, where the target activation code is associated with the information about the operator and the target APN information; and sending the target activation code to the first node.

According to the foregoing method, in an embodiment, when the second node is a vehicle server, the first node may obtain the target activation code from the third node, and a plurality of implementations of a mechanism for configuring the APN information is provided, thereby improving flexibility of the configuration mechanism. For example, the third node may include a smart device associated with the vehicle, an in-vehicle application running on the vehicle, or another apparatus. Details are not described herein again.

With reference to the second aspect, in an embodiment, the target activation code indicates a first functional entity from which a target profile is to be obtained, and the target profile is associated with the target APN information. For example, the first functional entity may be the foregoing SM-DP+ entity. According to the foregoing method, in an embodiment, the second node may indicate, by using the target activation code, the first functional entity from which the target profile is to be obtained, so that the first node may obtain the target APN information based on the target profile and access the target communication network.

According to a third aspect, an embodiment of this application provides an in-vehicle communication apparatus, including an obtaining unit, configured to: obtain target APN information of the first node based on information about an operator that provides a service for the first node, where the target APN information indicates at least two APNs, and the at least two APNs include a customized APN of the first node; and an access unit, configured to access a target communication network based on the information about the operator and the target APN information.

With reference to the third aspect, in an embodiment, the obtaining unit is further configured to obtain a target profile of the first node, where the target profile includes the information about the operator, and the target profile is associated with the target APN information.

With reference to the third aspect, in an embodiment, the obtaining unit is further configured to obtain target activation code of the first node, where the target activation code is associated with the information about the operator and the target APN information.

With reference to the third aspect, in an embodiment, the target activation code indicates a first functional entity from which a target profile of the first node is to be obtained.

With reference to the third aspect, in an embodiment, the obtaining unit is configured to obtain the target activation code of the first node from a second node, where the first node includes an in-vehicle terminal of a vehicle, and the second node includes any one of the following: a smart device associated with the vehicle, an in-vehicle application running on the vehicle, a vehicle server, or an operator server that provides the service for the vehicle.

With reference to the third aspect, in an embodiment, the obtaining unit is configured to obtain the target APN information of the first node from stored APN information; or obtain the target APN information of the first node from a third node, where the first node includes an in-vehicle terminal of a vehicle, and the third node includes any one of the following: a smart device associated with the vehicle, an in-vehicle application running on the vehicle, the vehicle server, or an operator server that provides the service for the vehicle.

With reference to the third aspect, in an embodiment, the apparatus further includes: a storage unit, configured to store the target APN information and/or mapping relationship information, where the mapping relationship information indicates an association relationship between the target APN information and one or more pieces of the following information: the first node, the information about the operator, the target profile of the first node, or the target activation code of the first node.

According to a fourth aspect, an embodiment of this application provides an in-vehicle communication apparatus, applied to a second node. The apparatus includes an obtaining unit, configured to: obtain target APN information of the first node based on information about an operator that provides a service for the first node, where the target APN information indicates at least two APNs, and the at least two APNs include a customized APN of the first node; and a communication unit, configured to send the target APN information to the first node.

With reference to the fourth aspect, in an embodiment, the second node is an operator server that provides the service, and the communication unit is configured to:

receive a first request from a third node, where the first request is used to apply for the service for the first node; and in response to the first request, send target activation code to the first node through the third node, where the target activation code is associated with the information about the operator and the target APN information.

With reference to the fourth aspect, in an embodiment, the first node includes an in-vehicle terminal of a vehicle, the second node is the vehicle server, and the obtaining unit is configured to obtain the target activation code of the first node from a third node, where the target activation code is associated with the information about the operator and the target APN information; and the communication unit is configured to send the target activation code to the first node.

With reference to the fourth aspect, in an embodiment, the target activation code indicates a first functional entity from which a target profile is to be obtained, and the target profile is associated with the target APN information.

According to a fifth aspect, an embodiment of this application provides an in-vehicle communication apparatus, including a processor and a memory. The memory stores a program; the processor is configured to execute the program stored in the memory, so that the apparatus implements the method according to any one of the first aspect and the possible implementations of the first aspect.

According to a sixth aspect, an embodiment of this application provides an in-vehicle communication apparatus, including a processor and a memory. The memory stores a program; the processor is configured to execute the program stored in the memory, so that the apparatus implements the method according to any one of the second aspect or the possible implementations of the second aspect.

According to a seventh aspect, an embodiment of this application provides an in-vehicle communication system, including the in-vehicle communication apparatus according to any one of the third aspect or the possible implementations of the third aspect, and the in-vehicle communication apparatus according to any one of the fourth aspect or the possible implementations of the fourth aspect.

With reference to the seventh aspect, in a possible implementation, the in-vehicle communication system may further include a smart device associated with a vehicle and/or an in-vehicle application running on the vehicle.

According to an eighth aspect, an embodiment of this application provides a computer-readable storage medium, where the computer-readable medium stores program code, and when the program code is run on a computer, the computer is enabled to perform the method according to any one of the first aspect or the possible implementations of the first aspect. Alternatively, when the program code is run on a computer, the computer is enabled to perform the method according to any one of the second aspect and the possible implementations of the second aspect.

According to a ninth aspect, an embodiment of this application provides a computer program product. When the computer program product is run on a computer, the computer is enabled to perform the method according to any one of the first aspect and the possible implementations of the first aspect, or perform the method according to any one of the second aspect and the possible implementations of the second aspect.

According to a tenth aspect, an embodiment of this application provides a chip system. The chip system includes a processor, configured to invoke a computer program or a computer instruction stored in a memory, so that the processor performs the method according to any one of the first aspect or the possible implementations of the first aspect, or perform the method according to any one of the second aspect and the possible implementations of the second aspect.

With reference to the tenth aspect, in an embodiment, the processor is coupled to the memory through an interface.

With reference to the tenth aspect, in an embodiment, the chip system further includes a memory. The memory stores a computer program or computer instructions.

According to an eleventh aspect, an embodiment of this application provides a processor. The processor is configured to invoke a computer program or a computer instruction stored in a memory, so that the processor performs the method according to any one of the first aspect or the possible implementations of the first aspect, or perform the method according to any one of the second aspect and the possible implementations of the second aspect.

Based on the implementations provided in the foregoing aspects, embodiments of this application may be further combined to provide more implementations. For technical effects that can be achieved by any one of the possible designs of the second aspect to the eleventh aspect, refer to descriptions of technical effects that can be achieved by any one of the possible designs of the first aspect or the second aspect. Repeated parts are not described.

DESCRIPTION OF EMBODIMENTS

Figure 1:
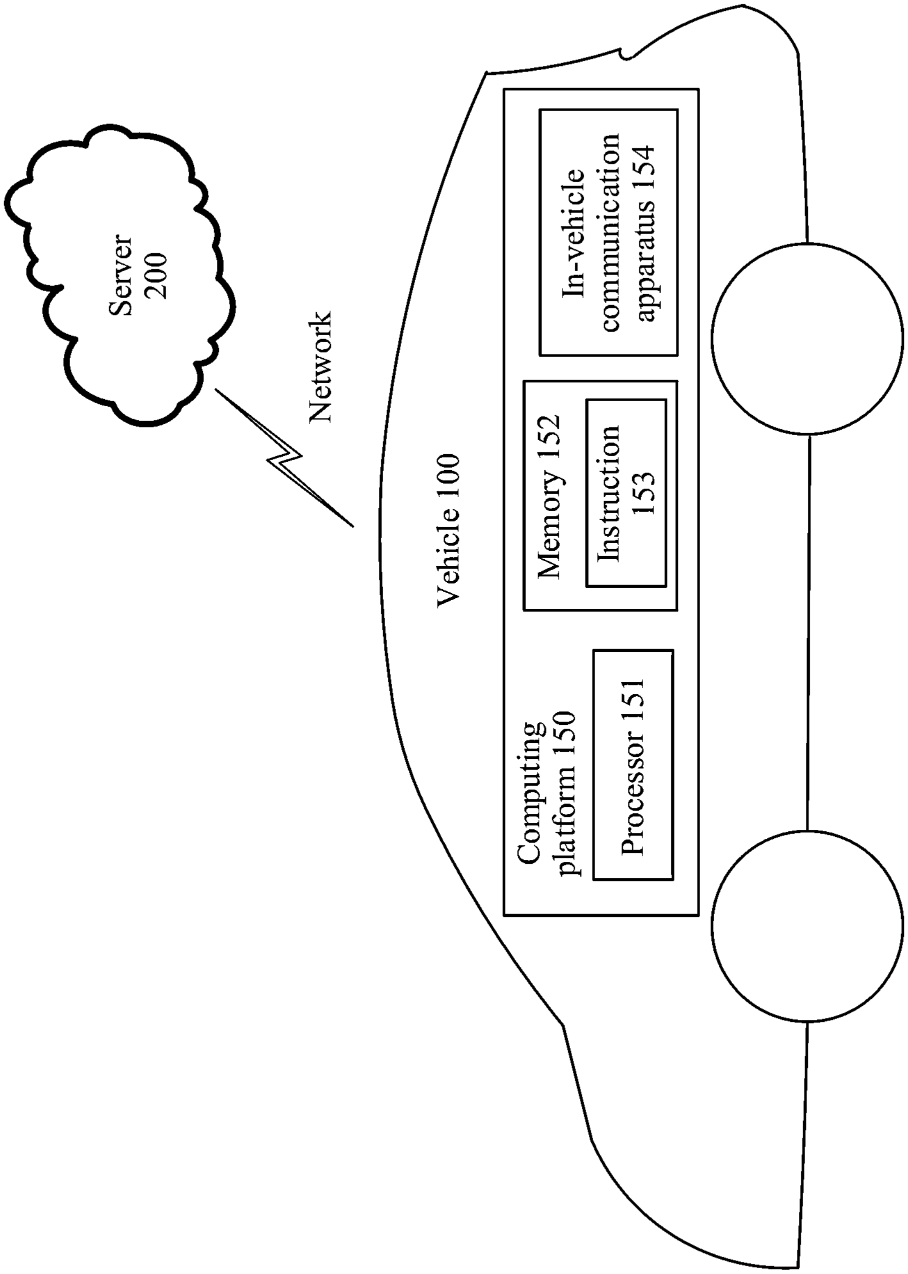
FIG. 1 is a schematic diagram of an application scenario to which an embodiment of this application is applicable.

To clearly understand embodiments of this application, the following first describes terms in embodiments of this application as examples.

(1) An access point network (APN) is a network access technology, and is a parameter that needs to be configured when a terminal device accesses a network. The APN determines an access mode used by the terminal device to access the network. For the terminal device, there are many types of external networks that can be accessed, for example, the Internet, a wireless application protocol (WAP) website, an internal network of a group enterprise, or an internal private network of an industry. However, different access points have different access ranges and access modes. How a network device side knows which network that the terminal device needs to access after being activated and allocates an Internet Protocol (IP) of a network segment needs to be distinguished by using the APN. In other words, the APN determines an access mode through which the terminal device accesses a network.

(2) APN information is information indicating an APN, and may include but is not limited to an APN name, an APN network identifier, or the like. The APN network identifier is an identifier that can be used by a user to connect to an external network through a general packet radio service (GPRS) gateway support node (GGSN)/packet data network gateway (PDN Gateway, PG). The identifier may be allocated by an operator to an Internet service provider (ISP) or an enterprise. In embodiments of this application, a vehicle manufacturer may preset a target profile of a target operator in an in-vehicle terminal of a vehicle before delivery of the vehicle, and the user may locally activate an eSIM service and a network access service based on the target profile. Alternatively, before delivery of a vehicle, an eSIM of an in-vehicle terminal of the vehicle is blank (namely, a blank card). The user may apply for handling an eSIM service, and directly or indirectly obtain, from an operator server (or a functional entity associated with the operator server, for example, a first functional entity), at least one of target APN information, target activation code, a target profile, and the like that are associated with operator information of a target operator, to complete configuration and activation of the eSIM service of the in-vehicle terminal. Alternatively, when the vehicle user has a change requirement for an operator or an APN, the vehicle user may apply to an operator server of a new target operator for handling an eSIM service according to embodiments of this application, obtain at least one of target APN information, target activation code, and a target profile based on an APN information configuration mechanism provided in embodiments of this application, and locally complete configuration and activation of the eSIM service on the in-vehicle terminal.

The in-vehicle terminal may support a plurality of APNs, for example, an APN that is allocated to the in-vehicle terminal and dedicated to implementing a network access function of the in-vehicle terminal, or an APN that is allocated to a user on an in-vehicle terminal side for network access. When configuring the APN information, the in-vehicle terminal may customize an APN, for example, a dedicated APN of the in-vehicle terminal. The customized APN may be used to implement the following services: an OTA upgrade package download service, a vehicle remote control service, a vehicle abnormality information reporting service, or the like.

It should be noted that the in-vehicle communication solution in embodiments of this application may be applied to the internet of vehicles, for example, vehicle to everything (V2X), long term evolution-vehicle (LTE-V), or vehicle to vehicle (V2V). For example, the in-vehicle communication solution may be applied to a vehicle having a mobile connectivity, or another apparatus having a mobile connectivity in a vehicle. The another apparatus includes but is not limited to another sensor like an in-vehicle terminal, an in-vehicle controller, an in-vehicle module, an automobile module, an in-vehicle component, an in-vehicle chip, an in-vehicle unit, an in-vehicle radar, or an in-vehicle camera. The vehicle may implement the in-vehicle communication method provided in embodiments of this application by using the in-vehicle terminal, the in-vehicle controller, the in-vehicle module, the automobile module, the in-vehicle component, the in-vehicle chip, the in-vehicle unit, the in-vehicle radar, or the in-vehicle camera. Certainly, the in-vehicle communication method in embodiments of this application may be further applied to an intelligent terminal having a movement control function other than a vehicle, or may be applied to an intelligent terminal having a movement control function other than a vehicle, or may be disposed in a component of the intelligent terminal. The intelligent terminal may be an intelligent transportation device, a smart home device, a robot, or the like, for example, including but not limited to an intelligent terminal or another sensor like a controller, a chip, a radar, or a camera in the intelligent terminal, and another component.

It should be noted that in embodiments of this application, a term "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Unless otherwise specified, ordinal numbers such as "first" and "second" mentioned in embodiments of this application are used to distinguish a plurality of objects, but are not used to limit priorities or importance degrees of the plurality of objects. For example, a first node and a second node are merely used to distinguish between different communication nodes, but do not indicate different priorities or importance degrees of the two communication nodes.

Currently, in the in-vehicle communication field, an in-vehicle terminal gradually supports a plurality of APNs. The APN is allocated to the in-vehicle terminal and is dedicated to implementing a network access function of the in-vehicle terminal, or allocated to a user for network access, to provide a plurality of services for a vehicle or the user, for example, an OTA service, a high-definition map service, an autonomous driving service or an assisted driving service, and an in-vehicle entertainment service (like an online audio, an online video, or an online voice). Generally, an embedded SIM card (Embedded-SIM, eSIM) is used to implement the network access function of the in-vehicle terminal based on operator information and corresponding APN information (for example, an APN identifier) that are configured by a vehicle manufacturer by default. Therefore, when the user has a requirement for changing the operator, the APN information cannot be correspondingly updated. Consequently, the network access function of the in-vehicle terminal is restricted.

For example, in the OTA service, a software manager may upload software to a cloud, and the vehicle may automatically download the software from the cloud or a user selects to download the software from the cloud, to update local software, so as to implement function upgrade or function update of a local vehicle system. For another example, an infotainment system of the vehicle may be upgraded by using the OTA. For still another example, an electronic control unit (ECU) of the vehicle may be upgraded by using the OTA, and vehicle performance may be upgraded by upgrading the ECU. For yet another example, a vehicle suspension system may be adjusted by upgrading the OTA, to provide more comfortable driving or sitting experience for the user.

Generally, to implement the plurality of services, an eSIM service needs to be enabled for the in-vehicle terminal and activated locally on the in-vehicle terminal. However, generally, the eSIM service can be handled and used by the user only after the user pays an specific amount of package usage fee. If a package fee provided by an operator that is configured by the vehicle manufacturer for the vehicle by default is not an optimal consumption solution expected by the user, the user is usually prone to have a requirement for changing the operator or the APN information. A current in-vehicle communication solution cannot provide a flexible mechanism for configuring an operator or APN information for the user. When the user has a requirement for changing the operator or the APN, the network access function of the in-vehicle terminal is limited.

Embodiments of this application provide an in-vehicle communication method, apparatus, and system. A flexible APN information configuration mechanism is introduced into a related in-vehicle communication standard protocol, so that a user can autonomously select an operator that provides a service, and flexibility of configuring APN information for an in-vehicle terminal is improved. The method and the apparatus are based on a same technical concept. The method and the apparatus have similar principles for resolving a problem. Therefore, for implementation of the apparatus and the method, refer to each other. Details of repeated parts are not described.

For ease of understanding, the following provides descriptions with reference to the accompanying drawings and embodiments.

FIG. 1 is a schematic diagram of an application scenario to which an embodiment of this application is applicable. In this application scenario, a vehicle 100 and a server 200 may be included, and the vehicle 100 and the server 200 may communicate with each other by using a network.

Some or all functions of the vehicle 100 are controlled by a computing platform 150. The computing platform 150 may include at least one processor 151. The processor 151 may execute instructions 153 stored in a non-transitory computer-readable medium like a memory 152. In some embodiments, the computing platform 150 may alternatively be a plurality of computing devices that control individual components or subsystems of the vehicle 100 in a distributed manner. The processor 151 may be any conventional processor, like a central processing unit (CPU). Alternatively, the processor 151 may further include a graphics processing unit (GPU), a field programmable gate array (FPGA), a system on chip (SOC), an application-specific integrated circuit (ASIC) or a combination thereof.

In addition to the instructions 153, the memory 152 may further store data, such as a road map, route information, a position, a direction, a speed, and other vehicle data of a vehicle, and other information. Such information may be used by the vehicle 100 and the computing platform 150 during operation of the vehicle 100 in autonomous, semi-autonomous, and/or manual modes. It should be understood that a structure of the vehicle in FIG. 1 should not be understood as a limitation on embodiments of this application.

In an embodiment, the computing platform 150 may further include an in-vehicle communication apparatus 154. The in-vehicle communication apparatus 154 may be configured to implement the in-vehicle communication method in embodiments of this application. For example, target access point network APN information of the in-vehicle terminal is obtained based on information about an operator that provides a service for an in-vehicle terminal of the vehicle, where the target APN information indicates at least two APNs, and the at least two APNs include a customized APN of the in-vehicle terminal, and indicate the in-vehicle terminal to access a target communication network based on the information about the operator and the target APN information.

In an embodiment, the vehicle 100 may be a car, a truck, a motorcycle, a bus, a boat, an airplane, a helicopter, a lawn mower, a recreational vehicle, a playground vehicle, a construction device, a trolley, a golf cart, a train, or the like. This is not limited in embodiments of this application.

In addition, the application scenario shown in FIG. 1 may further include the server 200.

In an embodiment of the application, the server 200 may be a vehicle server, an operator server that provides a service, or another server. Alternatively, an in-vehicle communication apparatus (not shown in the figure) may be deployed in the server 200 and is configured to implement the in-vehicle communication method in an embodiment of the application. For example, the server 200 may be used as a second node, and the in-vehicle communication apparatus deployed on the second node may obtain, based on information about an operator that provides a service for the first node (for example, an in-vehicle terminal of a vehicle), target APN information of the first node. The target APN information indicates at least two APNs, and the at least two APNs include a customized APN of the first node; and send the target APN information to the first node, so that the first node accesses the target communication network based on the information about the operator and the target APN information, to implement flexible configuration of the APN information of the in-vehicle terminal.

It should be noted that the in-vehicle communication apparatus 154 shown in FIG. 1 merely indicates that the computing platform 150 on a vehicle side may implement an in-vehicle communication function. The in-vehicle communication function may be implemented by an independent apparatus, or may be implemented by the processor 151. This is not limited in an embodiment of the application.

In an embodiment, the server 200 may alternatively be implemented by using a virtual machine.

Figure 2:
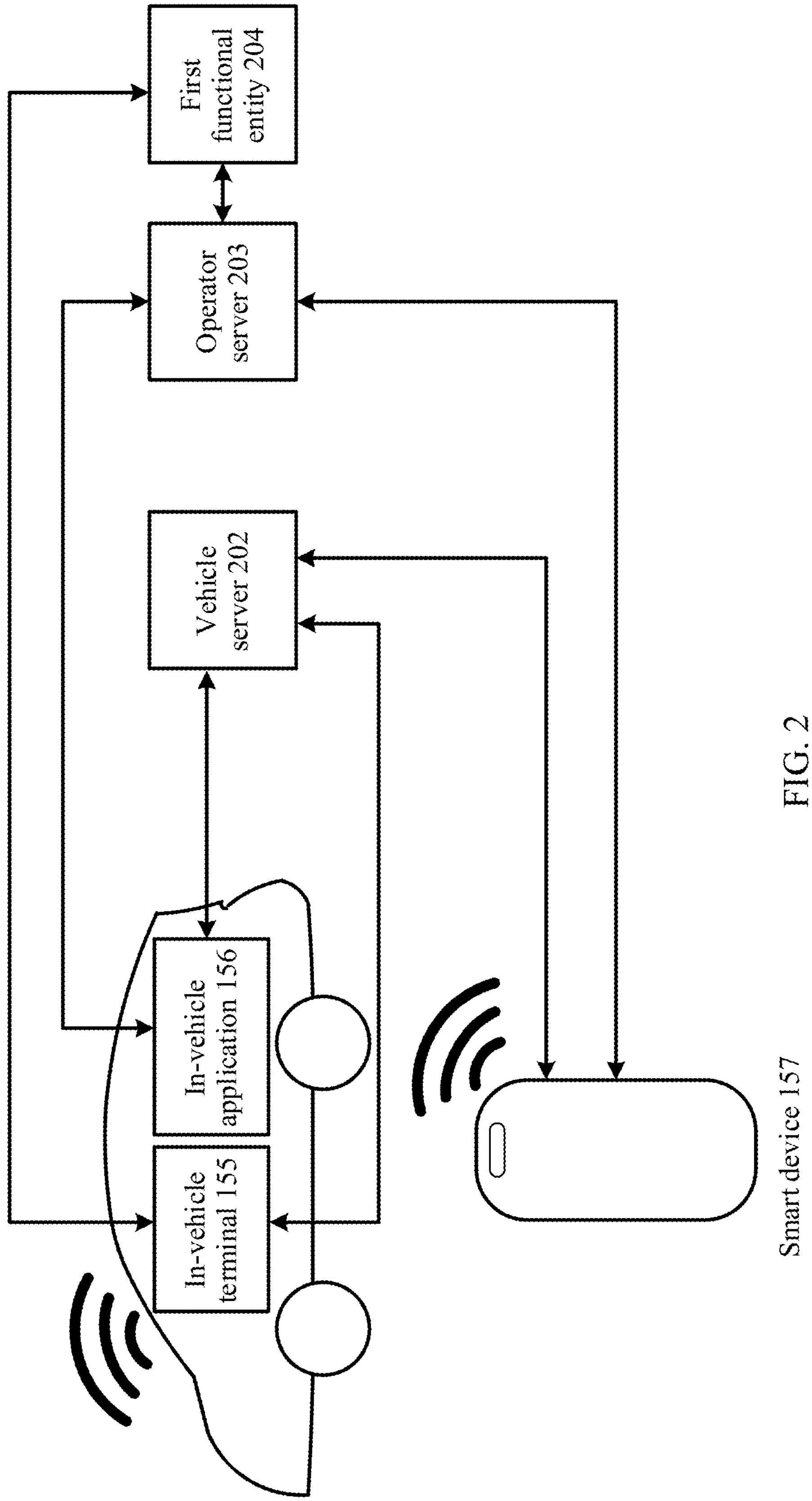
FIG. 2 is a diagram of a system architecture to which an embodiment of this application is applicable.

For example, FIG. 2 is a system architecture diagram to which an embodiment of this application is applicable. As shown in FIG. 2, a function of the in-vehicle communication apparatus 154 described in FIG. 1 may be performed by an in-vehicle terminal 155 (or referred to as an in-vehicle application, a center console, an in-vehicle audio and video entertainment apparatus, or the like) of a vehicle 100. The vehicle 100 may further include an in-vehicle application 156 running on the vehicle 100. For example, the in-vehicle application 156 may be installed and run on the in-vehicle terminal 155.

The server 200 described in FIG. 1 may include at least one of a vehicle server 202, an operator server 203 that provides a service, and a first functional entity 204 that stores a profile. The in-vehicle communication apparatus 154 may be deployed in at least one of the vehicle server 202, the operator server 203 that provides the service, or the first functional entity 204 that stores the profile. For example, the first functional entity may be a subscription manager data preparation+(SM-DP+) functional entity described in an eSIM GSMA standard specification (for example, SGP.22), where "+" indicates that the functional entity is enhanced (for example, has more functions) compared with the SM-DP described in the SGP.02 protocol. In an optional manner, the first functional entity may be deployed in the operator server, or may be an independent device associated with the operator server. A product form or a deployment manner of the first functional entity is not limited in an embodiment of the application. In an embodiment, for example, the system may further include a smart device 157 associated with the vehicle 100. The smart device 157 includes but is not limited to a smartphone, a tablet computer or the like of a user. For ease of differentiation, the smart device 157 may alternatively be deployed in the in-vehicle terminal 155 at a vehicle end.

Figure 3:
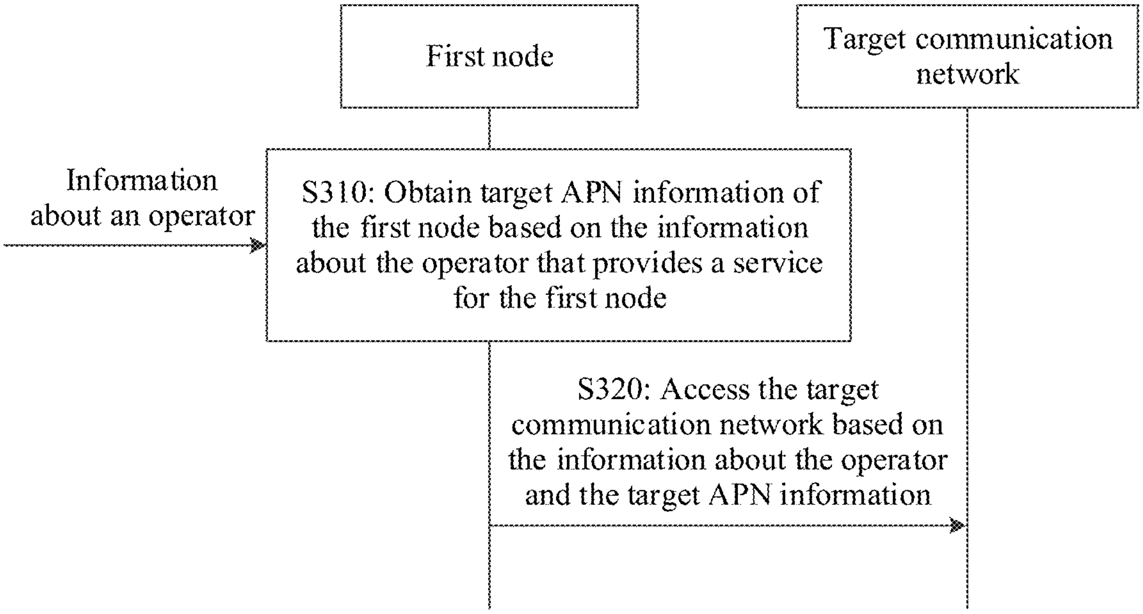
FIG. 3 is a schematic flowchart of an in-vehicle communication method according to an embodiment of this application.

In an embodiment, the in-vehicle terminal 155 may interact with at least one of the smart device 157 associated with the vehicle, the in-vehicle application 156 running on the vehicle, the vehicle server 202, the operator server 203 that provides a service for the vehicle, or the first functional entity 204, to implement the in-vehicle communication method in embodiments of this application. As shown in FIG. 3, an in-vehicle terminal 155 may be represented as a first node, and the first node may obtain information about an operator that provides a service for the first node, and perform the following operations.

S310: The first node obtains target APN information of the first node based on the information about the operator that provides the service for the first node, where the target APN information indicates at least two APNs, and the at least two APNs include a customized APN of the first node.

S320: The first node accesses a target communication network based on the information about the operator and the target APN information.

In an embodiment of the application, the service may be, for example, a network connection service provided by an operator for the first node (including the first node and/or a user on a first node side). The first node may support a plurality of different operators, and the first node may select a target operator from the plurality of different operators, and apply to the target operator for handling an eSIM service, to provide a network access service for the first node after the eSIM service is enabled. When the handling application succeeds, the target operator becomes an operator that provides a service for the first node. In S310, the first node may obtain the target APN information of the first node based on the operator information of the target operator, and at least two APNs indicated by the target APN information belong to the target operator. In S320, the first node may access the target communication network based on the operator information and the target APN information. Correspondingly, the target operator may provide a corresponding network connection service for the first node and/or the user on the first node side based on the at least two APNs.

For example, the first node is an in-vehicle terminal of a vehicle. For example, the at least two APNs indicated by the target APN information may include an APN allocated to a user of the vehicle for use, and may be used to provide the user with the following network connection services: online navigation, online audio, online video, online voice, or the like. Alternatively, the at least two APNs indicated by the target APN information may include, for example, a dedicated APN used for an in-vehicle terminal, and may be configured to provide the in-vehicle terminal with the following network connection services: a remote viewing service of dashboard camera data, a remote vehicle control service, a security surveillance service, an OTA upgrade package (for example, including a firmware upgrade package and/or a software upgrade package) download service, or a vehicle abnormality information reporting service. The dedicated APN of the in-vehicle terminal may include a customized APN. The customized APN may be used to implement the following network connection services: an OTA upgrade package download service, a vehicle remote control service, a vehicle abnormality information reporting service, or the like.

It should be noted that, in an embodiment of the application, for ease of description and understanding, various network access services provided by an operator for the first node are collectively referred to as services, including but not limited to a network access service (including a dedicated service) provided for the first node or various services provided for a user of the first node. Details are not distinguished and described one by one in the following.

In an embodiment of the application, S310 and S320 are implementation processes of a mechanism for configuring the target APN information. The mechanism for configuring the target APN information may be flexibly implemented in a plurality of manners.

In an embodiment, the in-vehicle terminal may store one or more pieces of or APN information of different operators. After learning of the information about the operator that provides the service for the in-vehicle terminal, the in-vehicle terminal may obtain the target APN information of the first node from the stored APN information based on the information about the operator, and perform configuration and access the target communication network based on the target APN information.

In an embodiment, the in-vehicle terminal may obtain the target APN information from an apparatus other than the in-vehicle terminal, and the target APN information may be directly obtained or indirectly obtained by using other information.

For example, after learning of the information about the operator that provides the service for the in-vehicle terminal, the first node may obtain a target profile from a first functional entity. The target profile includes the information about the operator, and the target profile is associated with the target APN information. The first node may perform configuration and access the target communication network based on the target profile.

For another example, the first node may obtain target activation code from the second node, where the target activation code is associated with the information about the operator and the target APN information. The target activation code indicates the first functional entity from which the target profile of the first node is to be obtained, and the first node may perform configuration and access the target communication network based on the target activation code. The second node may include but is not limited to any one of the following: a smart device associated with the vehicle, an in-vehicle application running on the vehicle, a vehicle server, or an operator server that provides a service for the vehicle.

In addition, the in-vehicle terminal may further store the target APN information and/or mapping relationship information. The mapping relationship information indicates an association relationship between the target APN information and one or more pieces of the following information: the first node, the information about the operator, the target profile of the first node, or the target activation code of the first node. The first node may access the target communication network based on stored related information as required.

In different cases, the in-vehicle communication method implemented in S310 and S320 may involve interaction between different nodes. For ease of understanding, the following uses an example in which the first node is an in-vehicle terminal of a vehicle, a second node/third node includes any one of a smart device associated with the vehicle, an in-vehicle application running on the vehicle, a vehicle server, or an operator server that provides a service for the vehicle, and the first functional entity is the foregoing SM-DP+, and the in-vehicle communication method in embodiments of this application is described with reference to different examples.

Example 1: Operator servers of different operators may store one or more pieces of APN information negotiated with a vehicle manufacturer. A user applies to the operator server for handling a service by using a smart device associated with a vehicle or an in-vehicle application running on the vehicle, and delivers target APN information to an in-vehicle terminal of the vehicle.

Example 1.1: The user may select a target operator from a plurality of operators, and apply to an operator server of the target operator for handling a service by using the smart device associated with the vehicle. The operator server may return the target APN information to the smart device, and the smart device may deliver the target APN information to the in-vehicle terminal.

Figure 4A:
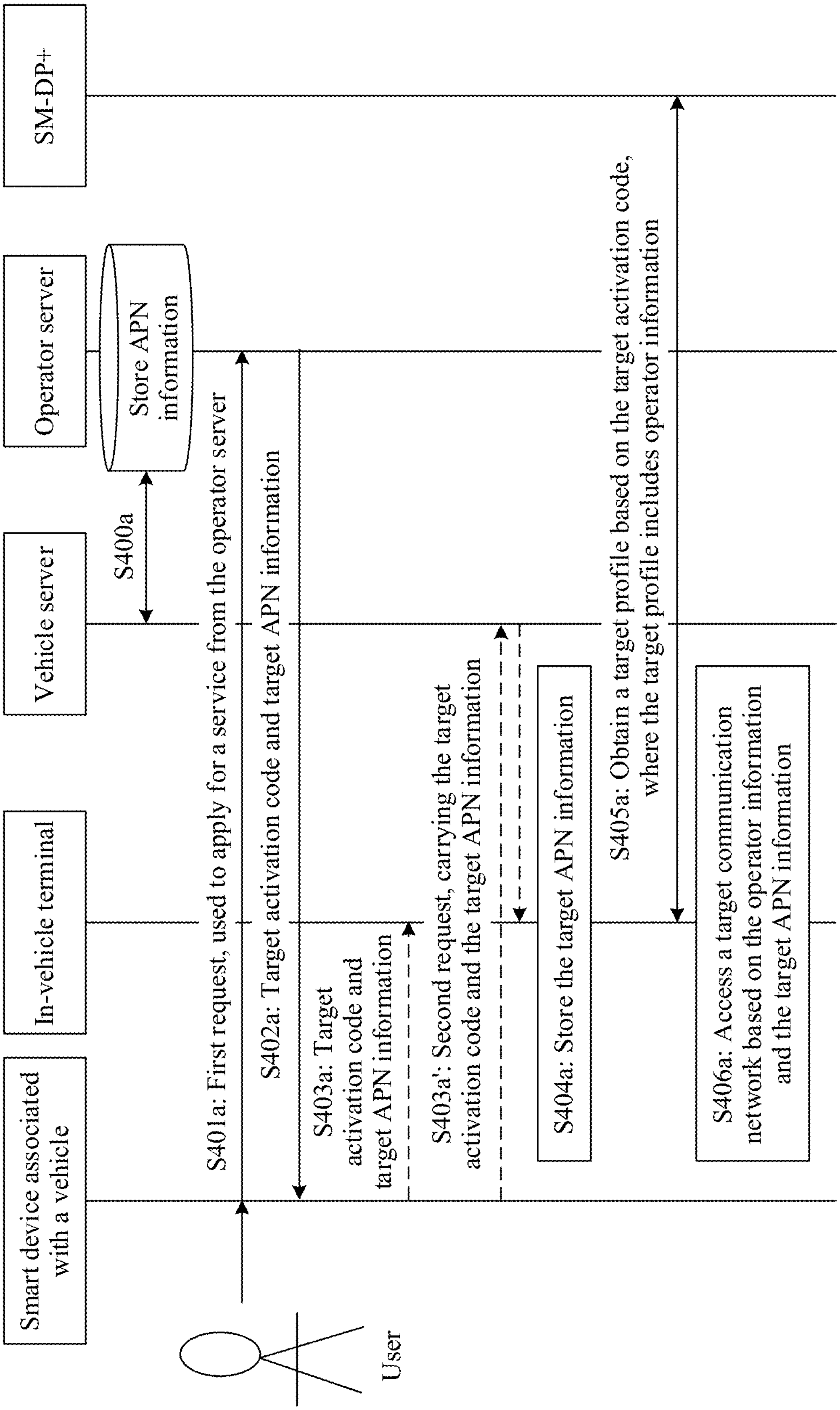
FIG. 4*a* and FIG. 4*b* are schematic flowcharts of an in-vehicle communication method according to an embodiment of this application.

Refer to FIG. 4*a*. The in-vehicle communication method may include the following operations.

S400*a*: For different operators, a vehicle manufacturer, as a vehicle service provider, may determine, by using a vehicle server through negotiation with each operator server that provides a network connection service for a vehicle, a vehicle identifier (for example, a vehicle identification number (Vehicle Identification Number, or vehicle identification number), referred to as a VIN for short), and one or more pieces of APN information corresponding to the vehicle identifier, and the operator server may store the one or more pieces of APN information determined through negotiation and the related vehicle identifier in association.

It should be understood that the operator server shown in FIG. 4*a* may have different understandings at different phases. For example, when the one or more pieces of APN information are configured through negotiation, the operator server shown in FIG. 4*a* may be understood as servers of different operators. For another example, in a subsequent phase of configuring APN information of an in-vehicle terminal, the operator server shown in FIG. 4*a* may be understood as a server of a target operator of the in-vehicle terminal. The following does not distinguish the operator servers.

S401*a*: After determining the target operator, a user may send a first request to the operator server of the target operator by using a smart device (the smart device is an example of a third node) associated with the vehicle, where the first request is used by the in-vehicle terminal to apply for a service from the operator server. Correspondingly, the operator server may receive the first request from the smart device, and process and respond to the first request.

For example, the first request may include the vehicle identifier (for example, the VIN) of the vehicle or an identifier of the in-vehicle terminal of the vehicle. It may be understood that the VIN in the following interaction process may be replaced with the identifier of the in-vehicle terminal.

S402*a*: In response to the first request, the operator server may handle a service for the in-vehicle terminal based on the VIN or the identifier of the in-vehicle terminal, and send, to the smart device, target activation code and target APN information associated with the VIN or the identifier of the in-vehicle terminal. The target activation code is associated with operator information, and may be used by the in-vehicle terminal to activate a service. At least two APNs indicated by the target APN information may be used by the in-vehicle terminal and/or a user of the in-vehicle terminal to implement a network connection service.

S403*a* (or S403*a*'): The in-vehicle terminal obtains target activation code of a first node and target APN information from a second node.

In an example, the second node may be the foregoing smart device associated with the vehicle. In S403*a*, the smart device may directly deliver the target activation code and the target APN information to the in-vehicle terminal in a short-range communication manner (including but not limited to Bluetooth and Wi-Fi).

In another example, the second node may alternatively be a vehicle server. In S403*a*', the smart device may send a second request to the vehicle server. The second request may carry the VIN or the identifier (not shown in the figure) of the in-vehicle terminal, the target activation code, and the target APN information in association, to request the vehicle server to deliver the target activation code and the target APN information to the in-vehicle terminal. Further, the vehicle server sends the target activation code and APN information to the in-vehicle terminal in response to the second request. Correspondingly, the in-vehicle terminal receives the second request from the smart device.

It should be understood that, in FIG. 4*a*, dashed line arrows corresponding to S403*a* and S403*a*' represent only two possible implementations of the operation. An implementation of the operation is not limited in an embodiment of the application.

S404*a*: The in-vehicle terminal stores the target APN information.

S405*a*: The in-vehicle terminal connects to a first functional entity (for example, SM-DP+, which is not distinguished and described in the following one by one) based on the target activation code, and obtains a target profile from the first functional entity. The target profile is associated with the target APN information, and the target profile includes the operator information.

S406*a*: The in-vehicle terminal accesses a target communication network based on the operator information and the target APN information.

For example, during implementation of S406*a*, the in-vehicle terminal may access the target communication network by using the stored target APN information when activating the target profile including the operator information.

Example 1.2: The user may select a target operator from a plurality of operators, and apply to an operator server of the target operator for handling a service by using an in-vehicle application running on a vehicle. The operator server returns the target APN information to the in-vehicle application, and the in-vehicle application may deliver the target APN information to the in-vehicle terminal.

Figure 4B:
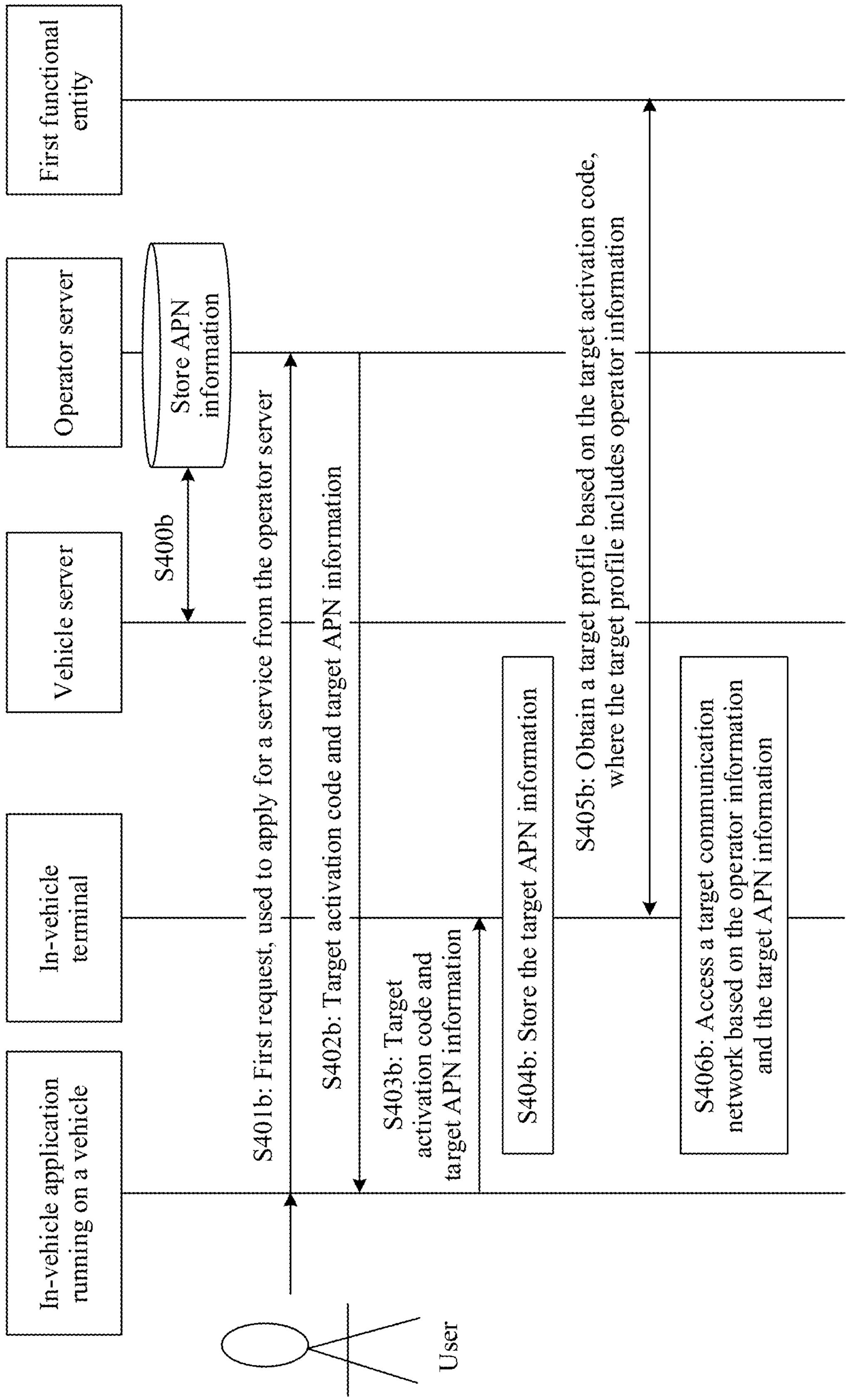

Refer to FIG. 4*b*. The in-vehicle communication method may include the following operations.

S400*b*: An operator server may store one or more pieces of APN information determined through negotiation with a vehicle server and a corresponding identifier in association. Refer to related descriptions in S400*a*. Details are not described herein again.

S401*b*: After determining a target operator, a user may send a first request to the operator server of the target operator by using an in-vehicle application (the in-vehicle application is an example of a third node) running on the vehicle, where the first request is used by an in-vehicle terminal to apply for a service from the operator server. Refer to related descriptions in S401*a*. Details are not described herein again.

S402*b*: In response to the first request, the operator server may send, to the in-vehicle application, target activation code and target APN information associated with a VIN or an identifier of the in-vehicle terminal. Refer to related descriptions in S402*a*. Details are not described herein again.

S403*b*: The in-vehicle terminal obtains target activation code of a first node and target APN information from a second node. For example, the in-vehicle application sends the target activation code of the first node and the target APN information to the in-vehicle terminal. It should be understood that, in an embodiment of the application, the in-vehicle application may be installed and run on the in-vehicle terminal. S402*b* and S403*b* may be implemented as one operation.

S404*b*: The in-vehicle terminal stores the target APN information.

S405*b*: The in-vehicle terminal connects to a first functional entity based on the target activation code, and obtains a target profile from the first functional entity. The target profile is associated with the target APN information, and the target profile includes operator information.

S406*b*: The in-vehicle terminal accesses a target communication network based on the operator information and the target APN information. Refer to related descriptions in S406*a*. Details are not described herein again.

Therefore, in the foregoing Example 1, the user may apply to the operator server of the target operator for a service for the in-vehicle terminal of the vehicle by using the smart device associated with the vehicle or the in-vehicle application running on the vehicle. After accepting the application, the operator server may handle the service for the in-vehicle terminal, and deliver the target activation code and the target APN information to the in-vehicle terminal of the vehicle by using the smart device or the in-vehicle application. In this way, the in-vehicle terminal can activate the service after obtaining the target profile, and access the target communication network by using the target APN information, to meet a service requirement of the in-vehicle terminal for flexibly configuring or updating the APN information, and improves flexibility of configuring the APN information.

Example 2: APN information of different operators may be stored in an apparatus other than the operator server, for example, a vehicle server, an in-vehicle terminal, a smart device, or an in-vehicle application. The user applies to the operator server for handling a service by using a smart device associated with a vehicle or an in-vehicle application running on the vehicle, and delivers target activation code to an in-vehicle terminal of the vehicle. The target activation code is associated with the target APN information. The vehicle server, the in-vehicle terminal, the smart device, or the in-vehicle application may obtain the target APN information by parsing the target activation code.

Example 2.1: The user may select a target operator from a plurality of operators, and apply to an operator server of the target operator for handling a service by using a smart device associated with a vehicle or an in-vehicle application running on a vehicle. The operator server may return the target activation code to the smart device or the in-vehicle application, and the smart device or the in-vehicle application may send the target activation code to the vehicle server or the in-vehicle terminal. The target activation code is associated with the target APN information.

Figure 5A:
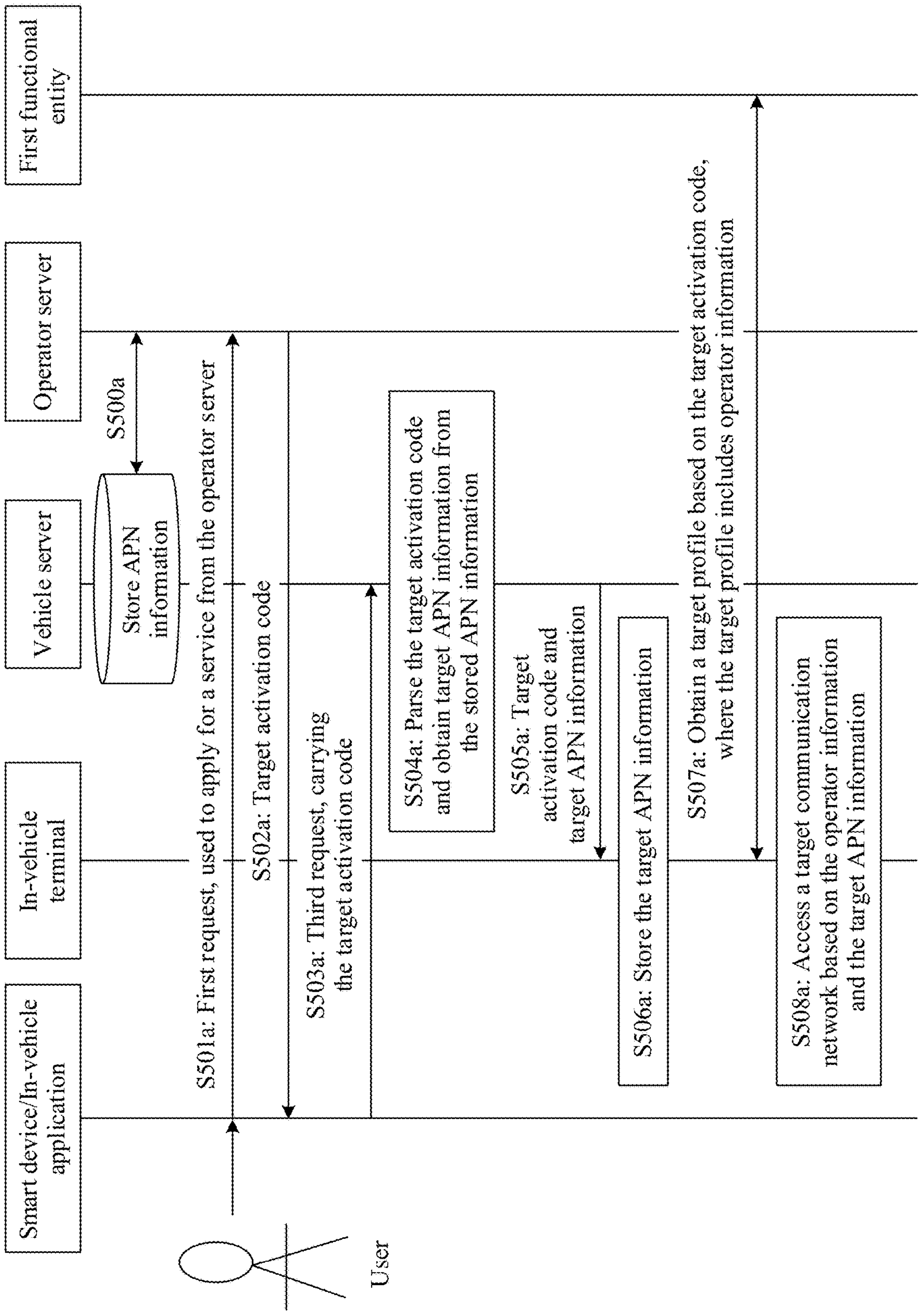
FIG. 5*a* and FIG. 5*b* are schematic flowcharts of an in-vehicle communication method according to an embodiment of this application.

Refer to FIG. 5*a*. The in-vehicle communication method may include the following operations.

S500*a*: A vehicle server negotiates with an operator server to determine one or more pieces of APN information, and stores the one or more pieces of APN information and a corresponding identifier in association. Refer to related descriptions in S400*a*. Details are not described herein again.

S501*a*: After determining a target operator, a user may send a first request to an operator server of the target operator by using a smart device associated with the vehicle/an in-vehicle application (the smart device or the in-vehicle application is an example of a third node) running on the vehicle, where the first request is used by an in-vehicle terminal to apply for a service from the operator server. Refer to related descriptions in S401*a*. Details are not described herein again.

S502*a*: The operator server may send target activation code to the smart device/in-vehicle application in response to the first request.

S503*a*: The smart device/in-vehicle application sends a third request to the vehicle server, where the third request may carry a VIN of the vehicle or an identifier (not shown in the figure) of the in-vehicle terminal and the target activation code. The third request may be used to request the vehicle server to deliver target APN information to the in-vehicle terminal based on the target activation code. Correspondingly, the vehicle server receives the third request from the smart device, and processes and responds to the third request.

S504*a*: The vehicle server may parse the target activation code in response to the third request, and obtain the target APN information of the in-vehicle terminal from the stored APN information.

S505*a*: The vehicle server sends the target activation code and the target APN information to the in-vehicle terminal.

It should be noted that S503*a* to S505*a* may be alternatively implemented in another manner. For example, in S505*a*, the vehicle server may send the target APN information to the smart device/in-vehicle application, and the smart device/in-vehicle application may assemble the target activation code obtained in S503*a* and the target APN information obtained in S505*a*, and then send the assembled target activation code and the target APN information to the in-vehicle terminal in a short-range communication manner. Alternatively, in S505*a*, the vehicle server may send the target activation code and the target APN information to the smart device/in-vehicle application. The smart device/in-vehicle application may send, to the in-vehicle terminal in a short-range communication manner, the target activation code and the target APN information that are returned by the vehicle server. This is not limited in an embodiment of the application. Details are not described herein again.

S506*a*: The in-vehicle terminal stores the target APN information.

S507*a*: The in-vehicle terminal connects to a first functional entity based on the target activation code, and obtains a target profile from the first functional entity. The target profile is associated with the target APN information, and the target profile includes the operator information.

S508*a*: The in-vehicle terminal accesses a target communication network based on the operator information and the target APN information. Refer to related descriptions in S406*a*. Details are not described herein again.

Example 2.2: The user may select a target operator from a plurality of operators, and apply to an operator server of the target operator for handling a service by using a smart device associated with a vehicle or an in-vehicle application running on a vehicle. The operator server returns the target activation code to the smart device/the in-vehicle application, and the smart device/the in-vehicle application may deliver the target activation code to the in-vehicle terminal. The target activation code is associated with the target APN information.

Figure 5B:
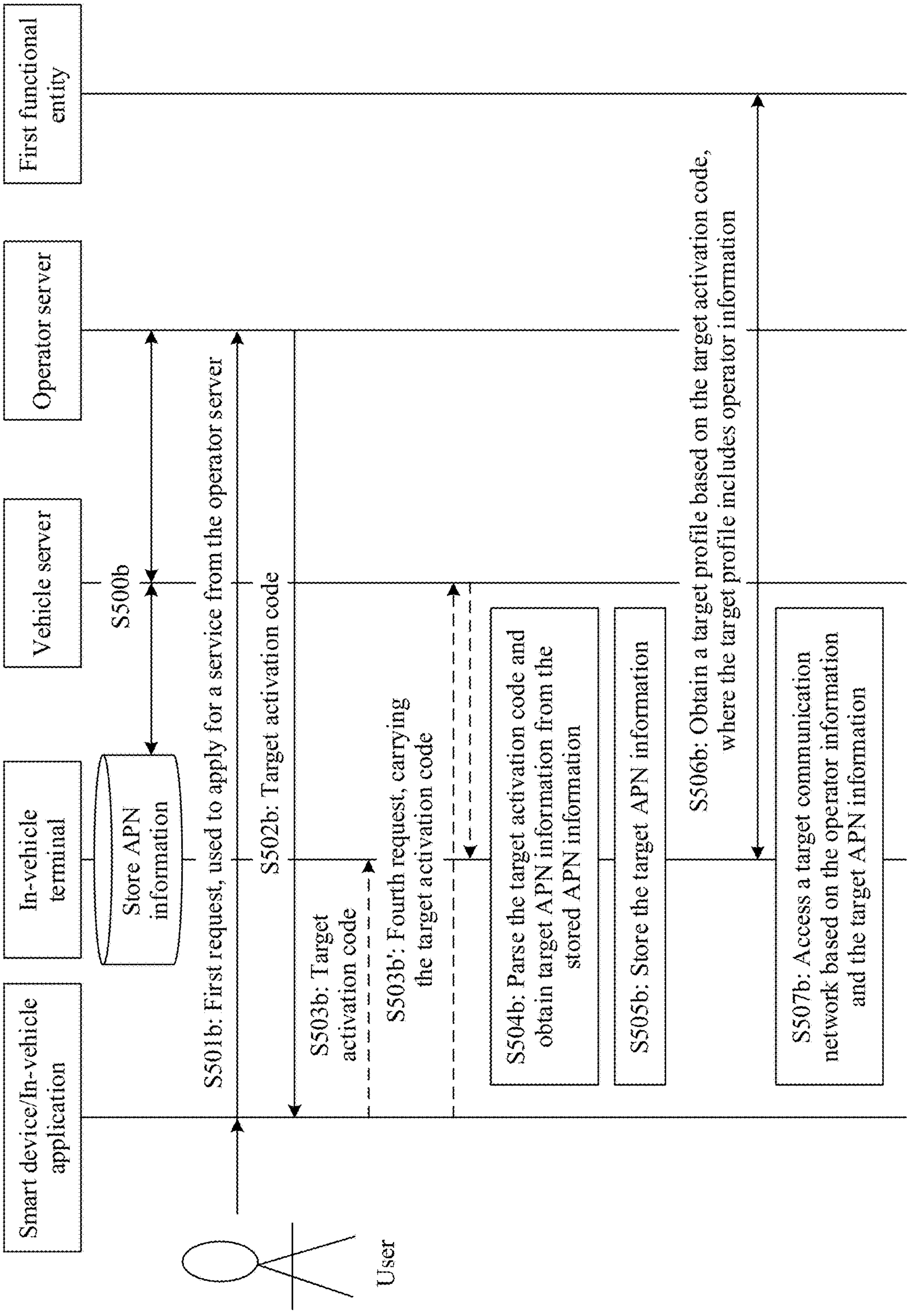

Refer to FIG. 5*b*. The in-vehicle communication method may include the following operations.

S500*b*: For different operators, a vehicle manufacturer, as a vehicle service provider, may determine, through negotiation, by using a vehicle server and a server of each operator that provides a network connection service for a vehicle, one or more pieces of APN information corresponding to a VIN of the vehicle. The vehicle server may send the one or more pieces of APN information determined through negotiation and a related identifier to an in-vehicle terminal in association for storage.

S501*b*: After determining a target operator, a user may send a first request to an operator server of the target operator by using a smart device associated with the vehicle or an in-vehicle application (the smart device or the in-vehicle application is an example of a third node) running on the vehicle, where the first request is used by the in-vehicle terminal to apply for a service from the operator server. Refer to related descriptions in S401*a*. Details are not described herein again.

S502*b*: The operator server may send target activation code to the smart device/in-vehicle application in response to the first request.

S503*b* (or 503*b*'): The in-vehicle terminal obtains target activation code of a first node and target APN information from a second node.

In an example, the second node may be the foregoing smart device/in-vehicle application. In S503*b*, the smart device may directly deliver the target activation code to the in-vehicle terminal in a short-range communication manner (including but not limited to Bluetooth, Wi-Fi, and the like). The in-vehicle application may be installed and run on the in-vehicle terminal, and the in-vehicle application may synchronize the target activation code on the in-vehicle terminal.

In another example, the second node may be a vehicle server. In S503*b*', the smart device may send a fourth request to the vehicle server. The fourth request may carry the VIN or the identifier (not shown in the figure) of the in-vehicle terminal, and the target activation code in association, to request the vehicle server to deliver the target activation code to the in-vehicle terminal. Correspondingly, the vehicle server receives the fourth request from the smart device/in-vehicle application, processes and responds to the fourth request, and sends the target activation code to the in-vehicle terminal in response to the fourth request. Correspondingly, the in-vehicle terminal receives the target activation code from the vehicle server.

It should be understood that, in FIG. 5*b*, dashed line arrows corresponding to S503*b* and S503*b*' represent only two possible implementations of the operation. An implementation of the operation is not limited in an embodiment of the application.

S504*b*: The in-vehicle terminal parses the target activation code, and obtains the target APN information of the in-vehicle terminal from the stored APN information.

S505*b*: The in-vehicle terminal stores the target APN information.

S506*b*: The in-vehicle terminal connects to a first functional entity based on the target activation code, and obtains a target profile from the first functional entity. The target profile is associated with the target APN information, and the target profile includes the operator information.

S507*b*: The in-vehicle terminal accesses a target communication network based on the operator information and the target APN information. Refer to related descriptions in S406*a*. Details are not described herein again.

Therefore, in the foregoing Example 2, the user may apply to the operator server of the target operator for a service for the in-vehicle terminal of the vehicle by using the smart device associated with the vehicle or the in-vehicle application running on the vehicle. After accepting the application, the operator server may handle the service for the in-vehicle terminal, and returns the target activation code to the smart device or the in-vehicle application. Further, the target activation code may be parsed by using the vehicle server or the in-vehicle terminal, and the target APN information is obtained from the stored APN information, and then stored in the in-vehicle terminal. In this way, the in-vehicle terminal can activate the service after obtaining the target profile, and access the target communication network by using the target APN information, to meet a service requirement of the in-vehicle terminal for flexibly configuring or updating the APN information, and improves flexibility of configuring the APN information.

It should be noted that, in an embodiment of the application, one or more pieces of APN information of different operators may alternatively be stored in a smart device associated with a vehicle or a vehicle running an in-vehicle application. Alternatively, the smart device or the vehicle may obtain the target activation code, and parse the activation code to obtain the target APN information from the stored APN information. In other words, the smart device or the vehicle may replace the vehicle server in FIG. 5*a* to implement a function of parsing the target activation code, or replace the in-vehicle terminal in FIG. 5*b* to implement a function of parsing the target activation code. For detailed implementations, refer to the foregoing related description. Details are not described herein again.

Example 3: APN information of different operators may be stored in an apparatus other than the operator server, for example, a vehicle server, an in-vehicle terminal, a smart device, or an in-vehicle application. The user applies to the operator server for handling a service by using a smart device associated with a vehicle or an in-vehicle application running on the vehicle, and delivers target activation code to an in-vehicle terminal of the vehicle. The in-vehicle terminal may obtain the target profile based on the target activation code, where the target profile includes the operator information. The in-vehicle terminal may obtain the target APN information based on the operator information obtained from the target profile.

Example 3.1: The user may select a target operator from a plurality of operators, and apply to an operator server of the target operator for handling a service by using a smart device associated with a vehicle or an in-vehicle application running on a vehicle. The operator server may return the target activation code to the smart device or the in-vehicle application, and the smart device or the in-vehicle application may send the target activation code to the in-vehicle terminal. The target activation code is associated with the target profile (for example, the target activation code indicates a first functional entity from which the target profile is to be obtained).

Figure 6A:
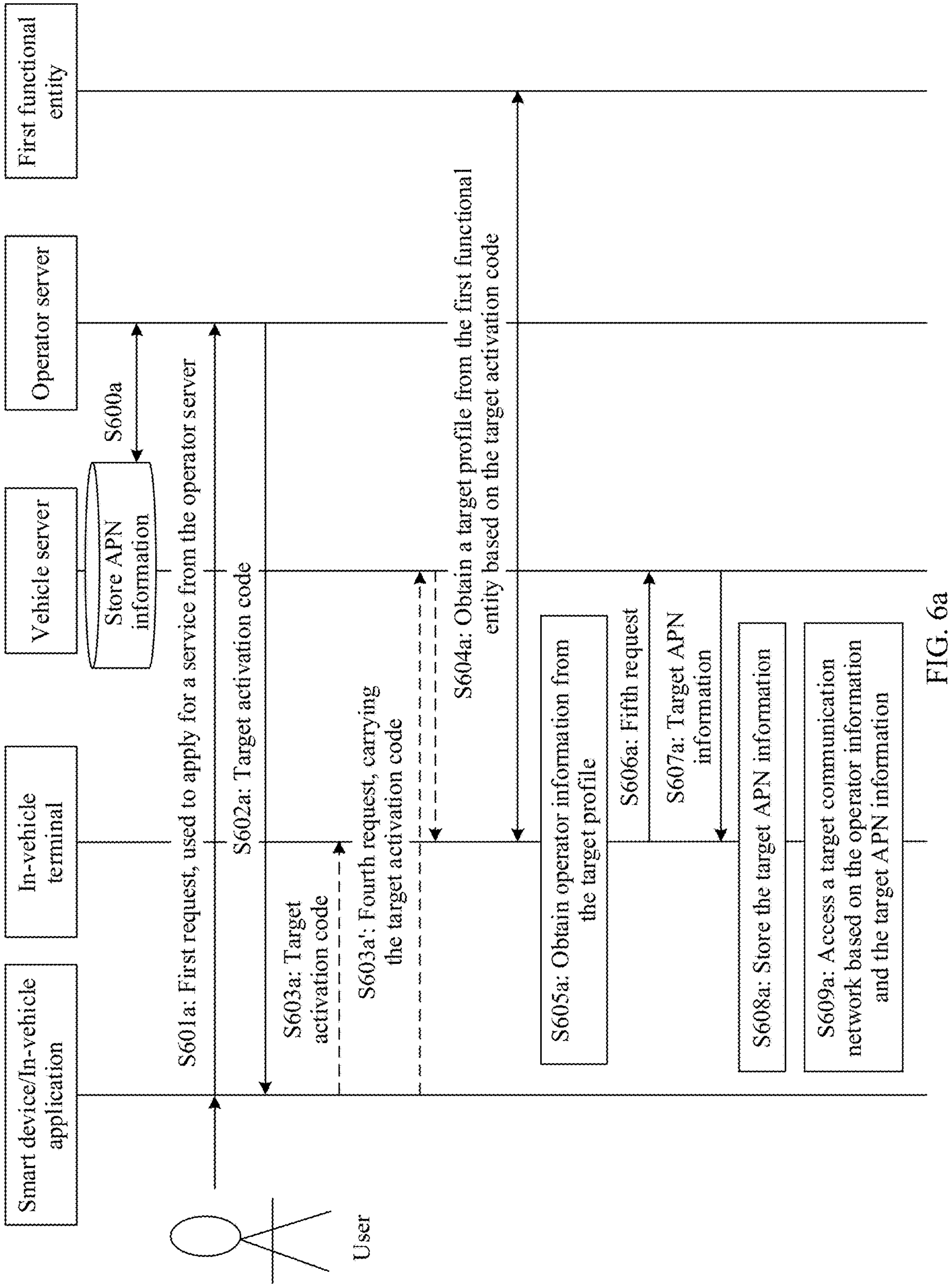
FIG. 6*a* and FIG. 6*b* are schematic flowcharts of an in-vehicle communication method according to an embodiment of this application.

Refer to FIG. 6*a*. The in-vehicle communication method may include the following operations.

S600*a*: A vehicle server negotiates with an operator server to determine one or more pieces of APN information, and stores the one or more pieces of APN information and a corresponding identifier in association. Refer to related descriptions in S400*a*. Details are not described herein again.

S601*a*: After determining a target operator, a user may send a first request to an operator server of a target operator by using a smart device associated with a vehicle/an in-vehicle application (the smart device or the in-vehicle application is an example of a third node) running on the vehicle, where the first request is used by an in-vehicle terminal to apply for a service from the operator server. Refer to related descriptions in S401*a*. Details are not described herein again.

S602*a*: The operator server may send target activation code to the smart device/in-vehicle application in response to the first request.

S603*a* (or S603*a*'): The in-vehicle terminal obtains target activation code of a first node from a second node. For detailed implementations, refer to the foregoing related description with reference to S503*b* (or S503*b*'). Details are not described herein again.

S604*a*: The in-vehicle terminal connects to a first functional entity based on the target activation code, and obtains a target profile from the first functional entity. The target profile is associated with target APN information, and the target profile includes operator information.

S605*a*: The in-vehicle terminal obtains the operator information from the target profile.

S606*a*: The in-vehicle terminal sends a fifth request to the vehicle server based on the operator information, where the fifth request carries the operator information, and the fifth request is used to request to obtain target APN information associated with the operator information. Correspondingly, the vehicle server receives the fifth request from the in-vehicle terminal.

S607*a*: The vehicle server obtains the target APN information from the stored APN information in response to the fifth request, and returns the target APN information to the in-vehicle terminal.

S608*a*: The in-vehicle terminal stores the target APN information.

S609*a*: The in-vehicle terminal accesses a target communication network based on the operator information and the target APN information. For details, refer to related descriptions in S406*a*. Details are not described herein again.

Example 3.2: The user may select a target operator from a plurality of operators, and apply to an operator server of the target operator for handling a service by using a smart device associated with a vehicle or an in-vehicle application running on a vehicle. The operator server returns the target activation code to the smart device/the in-vehicle application, and the smart device or the in-vehicle application may deliver the target activation code to the in-vehicle terminal. The target activation code is associated with the target APN information.

Figure 6B:
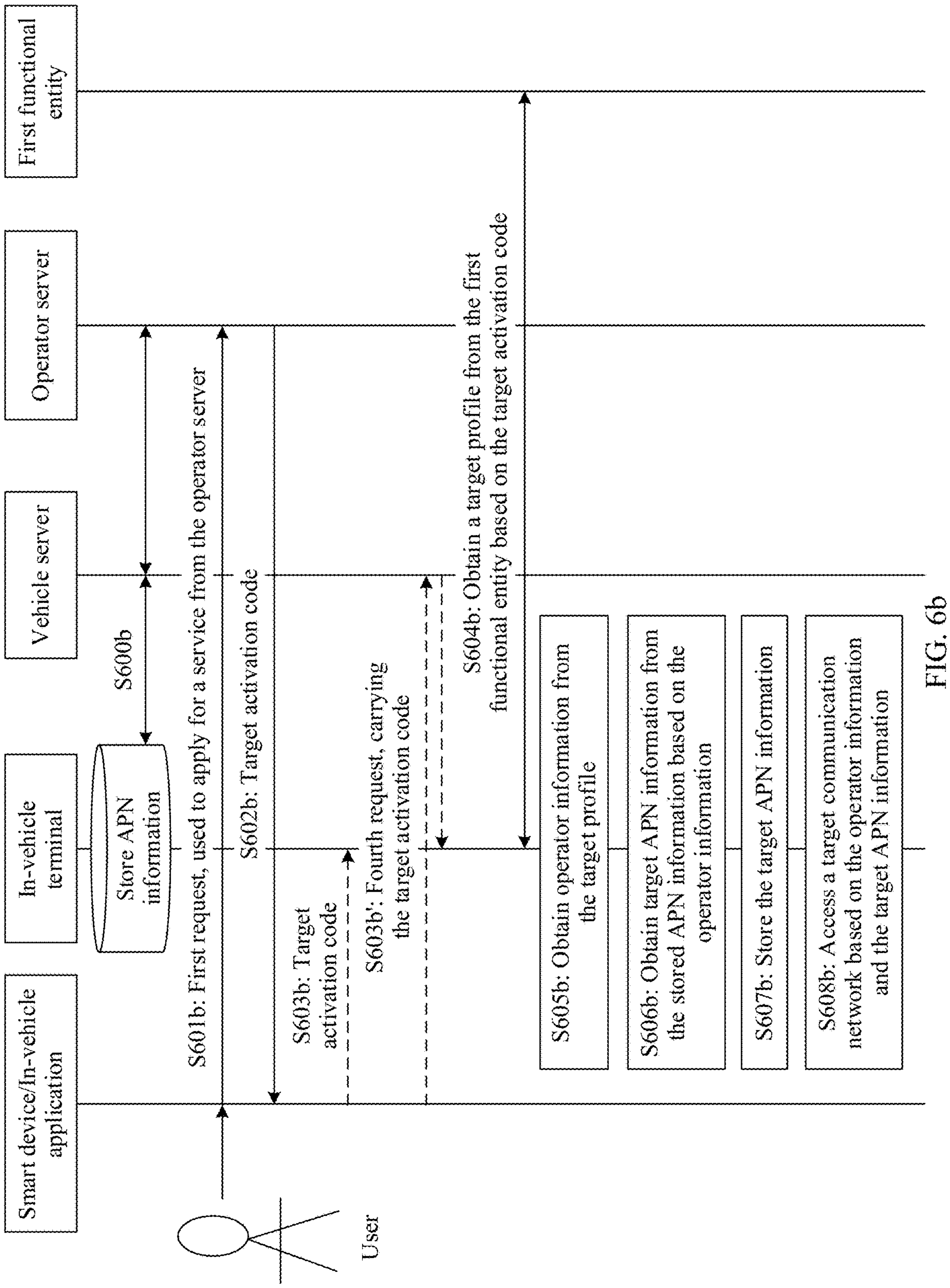

Refer to FIG. 6*b*. The in-vehicle communication method may include the following operations.

S600*b*: For different operators, a vehicle manufacturer, as a vehicle service provider, may determine, through negotiation, by using a vehicle server and a server of each operator that provides a network connection service for a vehicle, one or more pieces of APN information corresponding to a VIN of the vehicle. The vehicle server may send the one or more pieces of APN information determined through negotiation and a related identifier to an in-vehicle terminal in association for storage.

S601*b*: After determining a target operator, a user may send a first request to an operator server of the target operator by using a smart device associated with the vehicle or an in-vehicle application (the smart device or the in-vehicle application is an example of a third node) running on the vehicle, where the first request is used by the in-vehicle terminal to apply for a service from the operator server. Refer to related descriptions in S401*a*. Details are not described herein again.

S602*b*: The operator server may send target activation code to the smart device or in-vehicle application in response to the first request.

S603*b* (or S603*b*'): The in-vehicle terminal obtains target activation code of a first node and target APN information from a second node. Refer to the foregoing related description with reference to S503*b* (or S503*b*'). Details are not described herein again.

S604*b*: The in-vehicle terminal connects to a first functional entity based on the target activation code, and obtains a target profile from the first functional entity. The target profile is associated with the target APN information, and the target profile includes the operator information.

S605*b*: The in-vehicle terminal obtains the operator information from the target profile.

S606*b*: The in-vehicle terminal obtains the target APN information from the stored APN information based on the operator information.

S607*b*: The in-vehicle terminal stores the target APN information (and/or the foregoing mapping relationship information).

S608*b*: The in-vehicle terminal accesses a target communication network based on the operator information and the target APN information. For details, refer to related descriptions in S406*a*. Details are not described herein again.

Therefore, in the foregoing Example 3, the user may apply to the operator server of the target operator for a service for the in-vehicle terminal of the vehicle by using the smart device associated with the vehicle or the in-vehicle application running on the vehicle. After accepting the application, the operator server may handle the service for the in-vehicle terminal, and return the target activation code to the smart device or the in-vehicle application. The smart device or the in-vehicle application may deliver the target activation code to the in-vehicle terminal, so that the in-vehicle terminal may obtain the target profile from the first functional entity based on the target activation code, obtain the target APN information based on the operator information obtained from the target profile, and access the target communication network by using the target APN information, to meet a service requirement of the in-vehicle terminal for flexibly configuring or updating the APN information, and improve configuration flexibility of the APN information.

It should be understood that, the foregoing Example 3 is similar to Example 2. One or more pieces of APN information of different operators may alternatively be stored in a smart device associated with the vehicle or a vehicle running an in-vehicle application. The smart device or the vehicle may alternatively obtain, in response to a request from an in-vehicle terminal, the target APN information from the stored APN information and notify the smart device or the vehicle of the target APN information. That is, the smart device or the vehicle may replace the vehicle server in FIG. 6*a* or replace the in-vehicle terminal in FIG. 6*b* to implement a function of obtaining the target APN information based on the operator information obtained from the target profile. For detailed implementations, refer to the foregoing related descriptions. Details are not described herein again.

Therefore, according to the foregoing method and example, an APN information configuration mechanism is introduced into a related in-vehicle communication standard protocol, so that a user can autonomously select an operator that provides a service, and flexibility of configuring APN information for an in-vehicle terminal is improved, to meet a development requirement for an in-vehicle communication technology of a future intelligent vehicle.

An embodiment of this application further provides an in-vehicle communication apparatus, configured to perform the method performed by the in-vehicle communication apparatus on a vehicle side or the in-vehicle communication apparatus on a server side in the foregoing embodiments. For related features, refer to the foregoing method embodiments. Details are not described herein again.

Figure 7:
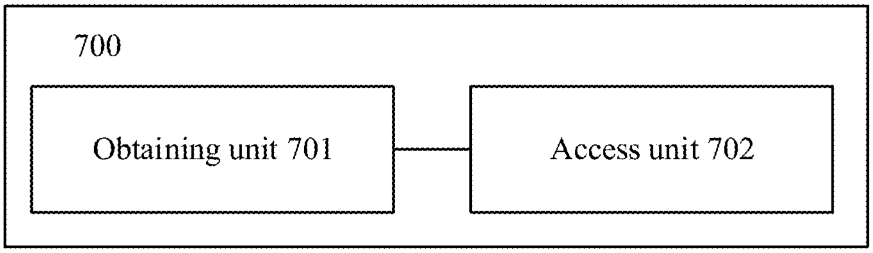
FIG. 7 is a schematic diagram of an in-vehicle communication apparatus according to an embodiment of this application.

As shown in FIG. 7, the apparatus 700 may include an obtaining unit 701, configured to obtain target APN information of a first node based on information about an operator that provides a service for the first node, where the target APN information indicates at least two APNs, and the at least two APNs include a customized APN of the first node; and an access unit 702, configured to access a target communication network based on the information about the operator and the target APN information. For an implementation, refer to detailed descriptions in the embodiments shown in FIG. 1 to FIG. 6*b*. Details are not described herein again.

Figure 8:
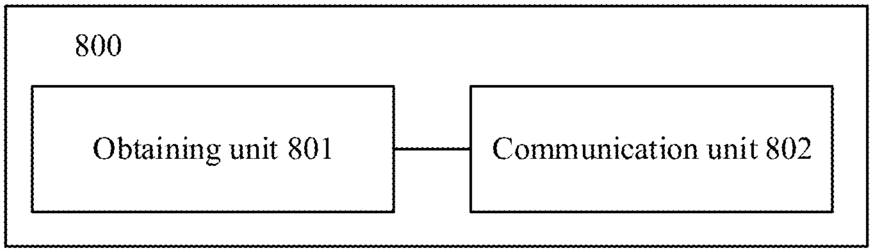
FIG. 8 is a schematic diagram of an in-vehicle communication apparatus according to an embodiment of this application.

As shown in FIG. 8, the apparatus 800 may include an obtaining unit 801, configured to obtain target APN information of a first node based on information about an operator that provides a service for the first node, where the target APN information indicates at least two APNs, and the at least two APNs include a customized APN of the first node; and a communication unit 802, configured to send the target APN information to the first node. For an implementation, refer to detailed descriptions in the embodiments shown in FIG. 1 to FIG. 6*b*. Details are not described herein again.

It should be noted that, in an embodiment of the application, division into the units is an example, and is merely a logical function division. In an embodiment, another division manner may be used. In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) or the processor to perform all or some of the operations of the methods described in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

Figure 9:
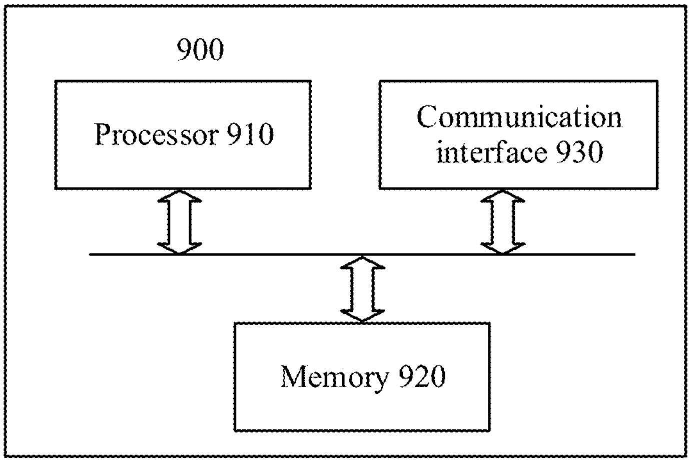
FIG. 9 is a schematic diagram of an in-vehicle communication apparatus according to an embodiment of this application.

In an embodiment, one of ordinary skilled in the art may figure out that the in-vehicle communication apparatus on the server side or the in-vehicle communication apparatus on the vehicle side in the foregoing embodiment may use a form shown in FIG. 9.

An apparatus 900 shown in FIG. 9 includes at least one processor 910 and a memory 920, and in an embodiment, may further include a communication interface 930.

In an embodiment of the application, a connection medium between the processor 910 and the memory 920 is not limited.

The apparatus shown in FIG. 9 further includes the communication interface 930, and when communicating with another device, the processor 910 may perform data transmission through the communication interface 930.

When the in-vehicle communication apparatus on the vehicle side uses the form shown in FIG. 9, the processor 910 in FIG. 9 may invoke computer executable instructions stored in the memory 920, so that the apparatus 900 can perform the method performed by the in-vehicle communication apparatus on the vehicle side in any one of the foregoing method embodiments.

When the in-vehicle communication apparatus on the server side uses the form shown in FIG. 9, the processor 910 in FIG. 9 may invoke computer executable instructions stored in the memory 920, so that the apparatus 900 can perform the method performed by the in-vehicle communication apparatus on the server side in any one of the foregoing method embodiments.

An embodiment of this application further relates to a chip system. The chip system includes a processor, configured to invoke a computer program or a computer instruction stored in a memory, so that the processor performs the method in any one of the foregoing embodiments.

In an embodiment, the processor is coupled to the memory through an interface.

In an embodiment, the chip system further includes a memory. The memory stores a computer program or computer instructions.

An embodiment of this application further relates to a processor. The processor is configured to invoke a computer program or a computer instruction stored in a memory, so that the processor performs the method in any one of the foregoing embodiments.

It should be understood that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

For example, an embodiment of this application relates to a computer-readable storage medium. The computer-readable medium stores program code. When the program code is run on a computer, the computer performs the foregoing method embodiment.

For another example, an embodiment of this application relates to a computer program product. When the computer program product is run on a computer, the computer is enabled to perform the foregoing method embodiment.

These computer program instructions may be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide operations for implementing a function in one or more procedures in the flowcharts and/or in one or more blocks in the block diagrams.

It is clearly that one of ordinary skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. An in-vehicle communication method, comprising:
- obtaining target access point network (APN) information of a first node based on information about an operator providing a service for the first node, wherein the target APN information indicates at least two APNs comprising a customized APN of the first node;
- obtaining target activation code of the first node, wherein the target activation code is associated with the information about the operator and the target APN information; and
- accessing a target communication network based on the information about the operator, the target activation code of the first node, and the target APN information.

2. The method according to claim 1, further comprising:
- obtaining a target profile of the first node, wherein the target profile comprises the information about the operator, and the target profile is associated with the target APN information.

3. The method according to claim 1, wherein the target activation code indicates a first functional entity from which a target profile of the first node is to be obtained.

4. The method according to claim 1, wherein the obtaining target activation code of the first node comprises:
- obtaining the target activation code of the first node from a second node, wherein the first node comprises an in-vehicle terminal of a vehicle, and the second node comprises one or more of: a smart device associated with the vehicle, an in-vehicle application running on the vehicle, a vehicle server, or an operator server providing the service for the vehicle.

5. The method according to claim 1, wherein the obtaining target APN information of the first node comprises:
- obtaining the target APN information of the first node from stored APN information; or
- obtaining the target APN information of the first node from a third node, wherein the first node comprises an in-vehicle terminal of a vehicle, and the third node comprises one or more of: a smart device associated with the vehicle, an in-vehicle application running on the vehicle, a vehicle server, or an operator server that provides the service for the vehicle.

6. The method according to claim 1, further comprising:
- storing the target APN information and/or mapping relationship information including an association relationship between the target APN information and one or more pieces of: the first node, the information about the operator, a target profile of the first node, or the target activation code of the first node.

7. An in-vehicle communication method, comprising:
- obtaining, by a second node, target access point network (APN) information of a first node based on information about an operator providing a service for the first node, wherein the target APN information indicates at least two APNs comprising a customized APN of the first node;
- obtaining target activation code of the first node from a third node, wherein the target activation code is associated with the information about the operator and the target APN information; and
- sending, by the second node, the target APN information and the target activation code to the first node.

8. The method according to claim 7, wherein the second node is an operator server providing the service, and the method further comprises:
- receiving a first request from the third node, wherein the first request is used to apply for the service for the first node; and
- in response to the first request, sending target activation code to the first node through the third node, wherein the target activation code is associated with the information about the operator and the target APN information.

9. The method according to claim 8, wherein the target activation code indicates a first functional entity from which a target profile is to be obtained, and the target profile is associated with the target APN information.

10. An in-vehicle communication apparatus, comprising:
- a processor; and
- a memory coupled to the processor to store instructions, which when executed by the processor, cause the apparatus to:
- obtain target access point network (APN) information of a first node based on information about an operator that provides a service for the first node, wherein the target APN information indicates at least two APNs, and the at least two APNs comprise a customized APN of the first node;
- obtain target activation code of the first node, wherein the target activation code is associated with the information about the operator and the target APN information; and
- access a target communication network based on the information about the operator, the target activation code of the first node, and the target APN information.

11. The apparatus according to claim 10, wherein the processor is further configured to execute the instructions to cause the communications apparatus to:
- obtain a target profile of the first node, wherein the target profile comprises the information about the operator, and the target profile is associated with the target APN information.

12. The apparatus according to claim 10, wherein the target activation code indicates a first functional entity from which a target profile of the first node is to be obtained.

13. The apparatus according to claim 10, wherein the processor is further configured to execute the instructions to cause the communications apparatus to:
- obtain the target activation code of the first node from a second node, wherein the first node comprises an in-vehicle terminal of a vehicle, and the second node comprises one or more of: a smart device associated with the vehicle, an in-vehicle application running on the vehicle, a vehicle server, or an operator server that provides the service for the vehicle.

14. The apparatus according to claim 10, wherein the processor is further configured to execute the instructions to cause the communications apparatus to:
- obtain the target APN information of the first node from stored APN information; or obtain the target APN information of the first node from a third node, wherein the first node comprises an in-vehicle terminal of a vehicle, and the third node comprises one or more of: a smart device associated with the vehicle, an in-vehicle application running on the vehicle, a vehicle server, or an operator server that provides the service for the vehicle.

15. The apparatus according to claim 10, wherein the processor is further configured to execute the instructions to cause the communications apparatus to:

store the target APN information and/or mapping relationship information indicating an association relationship between the target APN information and one or more pieces of: the first node, the information about the operator, a target profile of the first node, or the target activation code of the first node.

* * * * *